United States Patent [19]
Goldberg

[11] 3,714,470
[45] Jan. 30, 1973

[54] VARIABLE DUTY CYCLE SIGNAL GENERATOR

[75] Inventor: Jack Goldberg, Marshalltown, Iowa
[73] Assignee: Monsanto Company, St. Louis, Mo.
[22] Filed: Dec. 23, 1971
[21] Appl. No.: 211,246

[52] U.S. Cl. .................307/261, 307/228, 307/229, 307/251, 307/265, 307/271, 328/127
[51] Int. Cl. ..........................H03k 5/00, G06g 7/12
[58] Field of Search......307/228, 229, 260, 261, 265, 307/262, 271, 251, 304; 328/127, 146, 147

[56] References Cited

UNITED STATES PATENTS

| | | | |
|---|---|---|---|
| 3,138,767 | 6/1964 | Levin | 328/127 X |
| 3,191,071 | 6/1965 | King et al. | 307/228 |
| 3,274,501 | 9/1966 | Heinsen | 307/228 X |
| 3,277,395 | 10/1966 | Grindle et al. | 307/228 X |
| 3,440,448 | 4/1969 | Dudley | 307/271 |
| 3,639,843 | 2/1972 | Schmidhauser | 328/127 X |

*Primary Examiner*—Stanley D. Miller, Jr.
*Attorney*—Harold R. Patton et al.

[57] ABSTRACT

Described herein is a variable duty-cycle signal generator including an integrator circuit for generating a predetermined time-base reference signal which is generally triangular in shape. This time-base signal is compared with a D.C. input signal by a first comparator circuit, whose output is a signal comprised of a series of pulses and having a duty cycle corresponding to the level of the D.C. input signal. A second comparator circuit is employed to monitor the time-base signal and drive the integrator circuit such that the peaks or turn around points of the triangular signal are fixed to levels determined by reference potentials selectively applied to the input of the second comparator.

4 Claims, 3 Drawing Figures

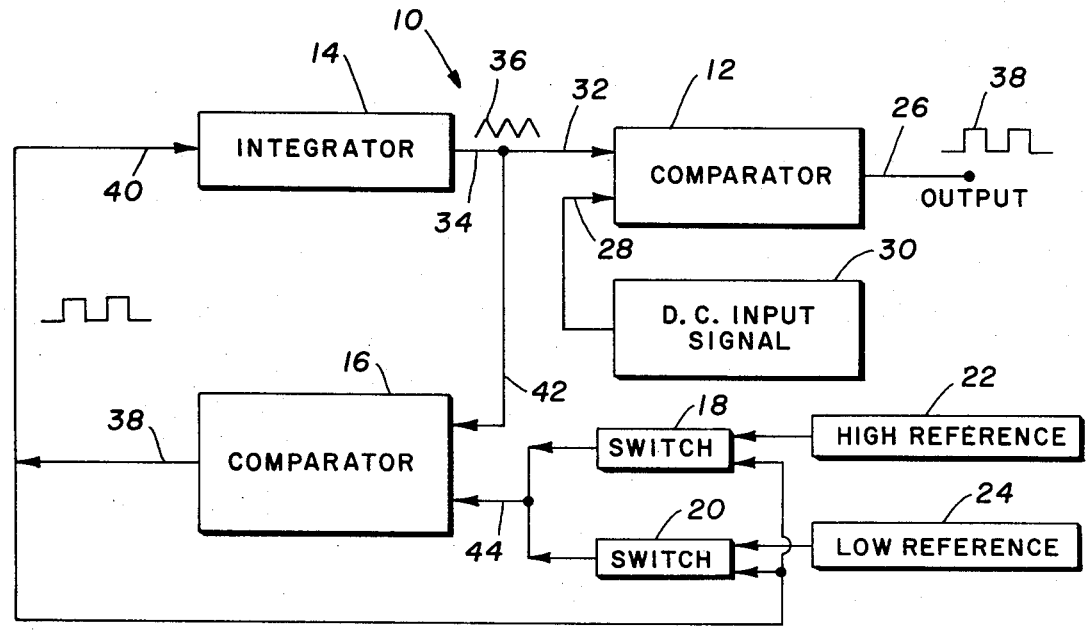
FIG. I.
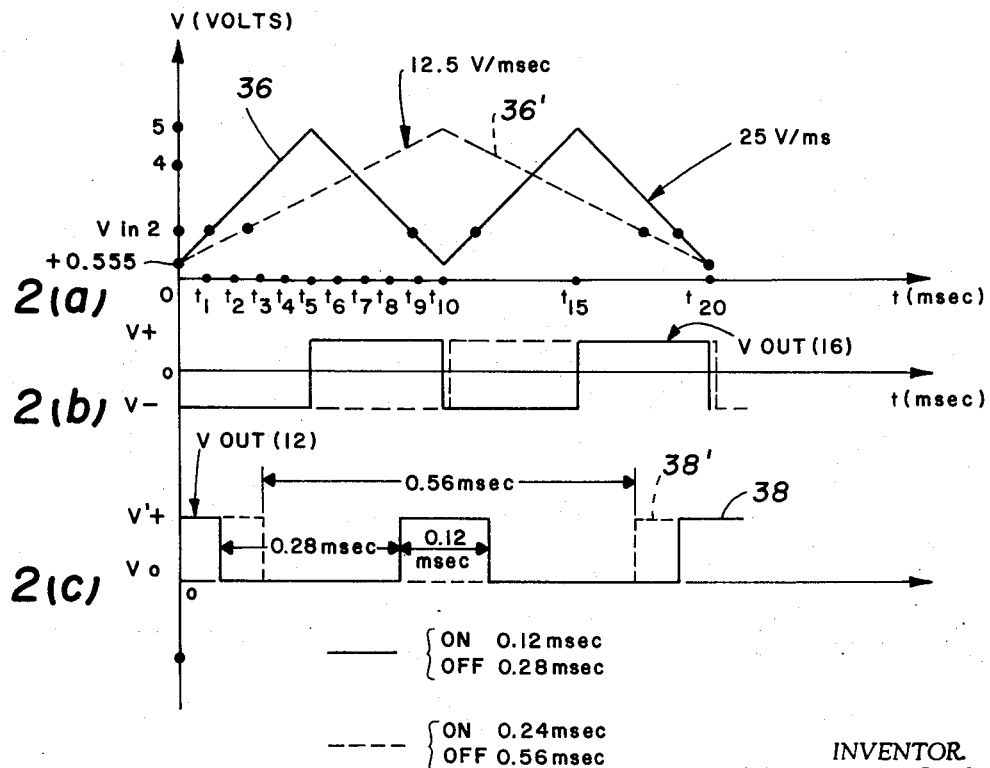
FIG. 2.
INVENTOR.
JACK GOLDBERG
BY Harold Q. Catton
ATTORNEY

VARIABLE DUTY CYCLE SIGNAL GENERATOR

FIELD OF THE INVENTION

The present invention relates generally to a variable duty cycle signal generator. More particularly, it pertains to electronic circuitry for providing an output signal whose duty cycle accurately corresponds to a particular direct current (D.C.) signal within a range of such signals, notwithstanding changes in electrical characteristics of circuit components due to temperature cycle, aging, and the like.

BACKGROUND OF THE INVENTION AND DESCRIPTION OF THE PRIOR ART

In many industrial control applications employed electronic circuitry and instrumentation, it is necessary to obtain a D.C. signal corresponding to the product of two variable D.C. signals. This is normally accomplished by means of signal multiplier circuitry. One common multiplication technique employed is that of generating an electrical signal comprising a series of pulse, each pulse having a width corresponding to the level of one of the D.C. signals and an amplitude of some fixed value. This signal is then modified; keeping the pulse width fixed, but varying the amplitude or pulse height in a manner corresponding to the level of the other D.C. signal. The resultant modified signal may then be filtered to achieve a D.C. signal of a valve corresponding to the product of the two original D.C. signals.

Heretofore, it has been a common practice for such multiplier circuits to employ integrator circuits together with complex and expensive feedback networks to control the duty cycle, and therefore pulse width, of the signal comprising the series of fixed amplitude pulses, each pulse having a width corresponding to the level of one of the D.C. input signals. Although such electrical circuits have served the general purpose, they have not proved entirely satisfactory because of the number of circuit components required and the expense of same.

The general purpose of this invention is to provide signal generator circuitry for producing an output signal, the duty cycle of which may be accurately varied in accordance with a D.C. input signal applied thereto, notwithstanding certain changes in the electronical characteristics of certain circuit components comprising the circuitry. To attain this, the present invention utilizes a unique combination of an electronic integrator circuit, a comparator circuit, and certain reference voltages to insure a linear time-base signal having fixed upper and lower limits and to which the variable D.C. signal may be referenced to achieve an accurate time-dependent, variable duty cycle signal.

An object of the present invention is the provision of a signal generator for producing an electrical signal whose duty cycle is precisely related to the particular level of a D.C. signal.

Another object of the present invention is the provision of a signal generator whose output signal is related to a time-base signal whose period is accurately controlled.

These objects (as well as other apparent herein) are achieved generally by providing an integrator circuit which is capable of generating positive or negative going ramp signals. A comparator circuit has one input coupled to the output of the integrator circuit, and its other input selectively connected by switch means to two fixed reference potentials. The output of the comparator is connected to the input of the integrator circuit and the switch means. In this manner the integrator circuit is switched between its positive and negative going ramp generating modes of operation to provide a time-base signal having a triangular waveform whose amplitude limits (or turn-around points) correspond to the values of the fixed reference potentials. Another comparator is then employed to compare an input signal having a particular D.C. level with the triangular waveform. The resultant output signal of this comparator has a duty cycle accurately corresponding to the D.C. input signal.

BRIEF DESCRIPTION OF THE DRAWINGS

Utilization of the present invention will become apparent from the following description as illustrated in the accompanying drawings, in which FIG. 1 is a block diagram representation of an embodiment of a variable duty cycle signal generator circuit in accordance with the present invention;

FIG. 2 is a graphical representation of typical waveforms resulting from the circuit of FIG. 1.

DETAILED DESCRIPTION OF GENERATOR CIRCUIT OF FIG. 1

Figure 3:
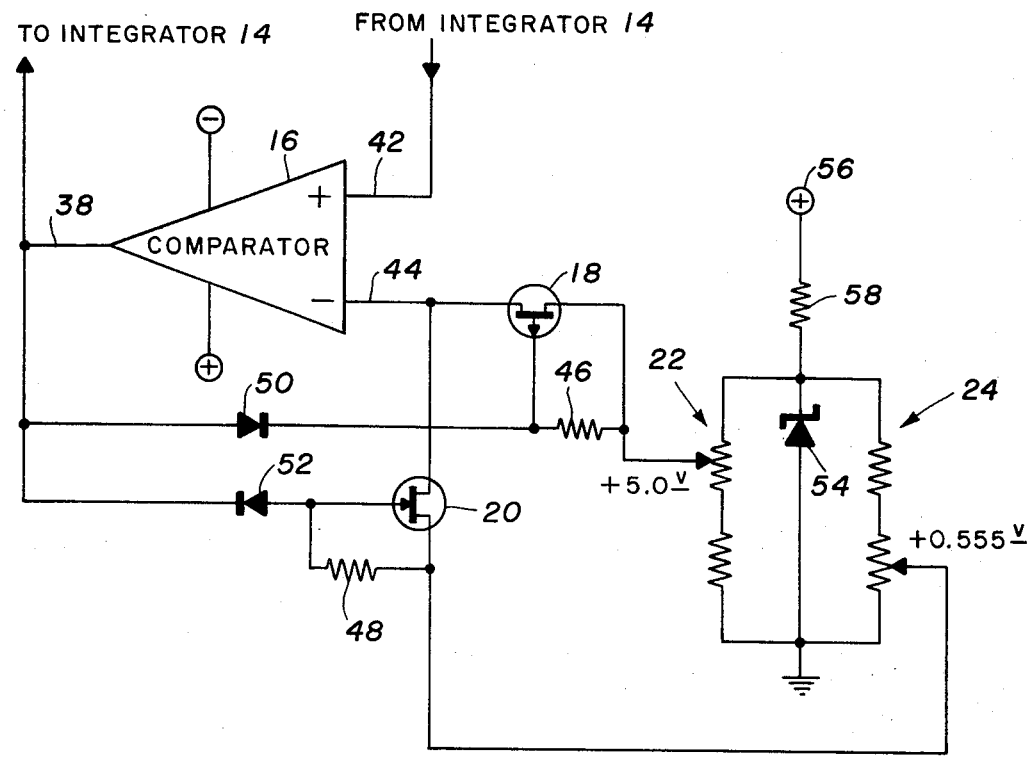
FIG. 3 is a schematic diagram of a portion of the circuit of FIG. 1 illustrating preferred switching devices to be employed therewith.

Referring now to the drawings, wherein like reference characters designate like or corresponding parts, there is shown in FIG. 1 a variable duty-cycle generator circuit, generally designated 10. The generator circuit 10 consists of a first comparator circuit 12, an integrator circuit 14, a second comparator circuit 16, two switches 18 and 20, and two reference potential sources 22 and 24. Preferably the comparator circuits 12, 16 and the integrator circuit 14 are comprised of conventional integrated-circuit type, operational amplifiers connected to perform the desired signal comparison and integration functions.

The output terminal 26 of the comparator circuit 12 serves as the output for the variable duty cycle generator circuit 10, and its input terminal 28 is coupled to a source 30 of a D.C. input signal, the level of which determines the duty cycle of the signal appearing at the output terminal 26. The specific manner in which this result is achieved and the operation of the component parts comprising the generator circuit 10 will be described in detail hereinafter. A second input terminal 32 of the comparator circuit 12 is coupled to the output terminal 34 of the integrator circuit 14 to receive a time-base, triangular reference signal, as indicated at 36, and compare it with the level of the D.C. input signal from the source 30.

In order to obtain a signal, such as that designated 38, at the output terminal 26 and comprising a series of pulses having a duty cycle accurately corresponding to the level of the D.C. input signal from the source 30, I have found that it is necessary that two conditions be met by the triangular waveform signal 36:

a. The ramps (sides of each triangle) must be linear, and b. The turn-around points (the upper and lower-most points of each ramp) must be the same for all cycles.

In most instances, well-known integrator circuit designs can be employed to achieve the desired linear ramp signals; however, the turnaround points tend to drift or vary with such variables as temperature changes, circuit component aging, and the like. I have found that the circuitry now to be described assures that the turn-around points remain substantially constant.

The comparator 16 has its output terminal 38 coupled to an input terminal 40 of the integrator circuit 14. One input 42 of the comparator 16 is coupled to the output terminal 34 of the integrator circuit 14, while its other input terminals 44 is coupled to the pair of switches 18 and 20. In turn, the switches 18 and 20 are connected to the high and low reference potential sources 22 and 24, respectively, and additionally are coupled to the output terminal 38 of the comparator circuit 16. For purposes which will become apparent hereinafter, the values of the high and low reference potential sources are chosen to correspond to the desired level of the high and low turn-around points of the triangular waveform signal 36.

OPERATION OF THE CIRCUIT 10 OF FIG. 1

Referring to FIG. 2, there are illustrated typical waveform signals resulting from the variable duty cycle signal generator circuit 10 of FIG. 1. In order to appreciate the operation of the circuit 10, assume that a D.C. input signal of 2 volts is applied to the input terminal 28 of the comparator circuit 12 and further that the integrator circuit 14 provides either a positive or negative-going ramp signal, having a linear rate of about 25 volts/millisecond, depending upon whether the signal applied to its input terminal 40 is negative or positive, respectively. Further assume that the upper and lower turn-around points for the triangular waveform signals are +5.0 volts and +0.555 volts, respectively. At time $t_0$ the output signal 36 of the integrator circuit 10 is shown at the +0.555 volt level, from which level it begins to ramp up at the 25 volt/millisecond rate under the influence of the V−(16) signal applied to its input terminal 40 by the comparator circuit 16 (see FIGS. 2(a) and 2(b)). When the triangular wave-form signal 36 reaches +2 volts at time $t_1$ as shown in FIG. 2(a) (about 0.06 millisecond), this is detected by the comparator circuit 12 and its output switches from V′+ volts to Vo volts, as indicated in FIG. 2(c). The signal 36 continues to ramp positively until it reaches +5 volts. At this point, the output of the comparator circuit 16 is −V volts which renders switch 18 closed and switch 20 open. Consequently, the +5 volts associated with the high reference potential source is applied to the input terminal 44 and the comparator output changes to +V volts, as indicated in FIG. 2(b). This change of the output of the comparator circuit 16 accomplishes two purposes: (1) it reverses the states of the switches 18 and 20; i.e., switch 18 opens and switch 20 closes to apply +0.555 volts to the input terminal 44 of the comparator circuit 16, and (2) it drives the integrator circuit 14 so that the triangular signal 36 ramps down in the negative direction.

The triangular signal 36 continues to ramp down until it reaches +0.555 volts at which time the comparator circuit 16, and switches 18 and 20 are reset to their original conditions to initiate a second cycle of operation. In so doing, the triangular waveform signal 36 passes through the +2 volt level resulting in the triggering of the comparator circuit 12, which switches from Vo volts to its V+′ output level at time $t_8$ (about 0.34 millisecond). As may be readily seen from FIG. 2, the result of several cycles of operation, such as that just described, is an output signal 38 having a duty cycle comprised of an "on" time (when its level is positive V+′) of 0.12 millisecond and an "off" time (when its level is zero Vo) of 0.28 milliseconds. It should be apparent that this specific duty cycle of approximately 43 percent corresponds to the D.C. input signal level of +2 volts and that other duty cycles are achieved where the D.C. input signal is varied to some other level other than +2 volts within the range of +0.555 volts and 5 volts.

An important advantage of the variable duty cycle generator circuit 10 of the present invention is illustrated by the dashed line wave-forms in FIG. 2. These dashed line waveforms represent the condition where, for example, the circuit component characteristics of the integrator circuit change unexpectedly and result in a triangular waveform signal 36′, which is linear over its positive and negative ramp portions, but whose rate is changed from the desired 25 v/milliseconds to 12.5v/milliseconds. As will now be explained, this variation in the circuit components does not result in an erroneous duty-cycle rate as long as the turn-around points remain constant as assured by the present invention. It is to be noted that the triangular waveform signal 36′ results in an output signal 38′(see FIGS. 2(c)) having an "on" time of about 0.24 milliseconds and an "off" time of about 0.56 milliseconds. This corresponds precisely to the 43 percent duty cycle obtained with the ramp rate of 25 v/milliseconds.

Consequently, it should now be apparent that the variable duty-cycle signal generator circuit 10 provides an output signal whose duty cycle accurately corresponds to the level of the D.C. input signal notwithstanding changes or variations in the rate of the time-base reference signal; i.e., the triangular waveform signal 36.

Referring now to FIG. 3, there is shown a preferred circuit arrangement for switching the high and low reference potential sources 22 and 24 to the input terminal 44 of the comparator circuit 16. The switches 18 and 20 take the form of P and N channel field effect transistors (FET), respectively. The source-drain paths of the FETs 18 and 20 are connected between the input terminal 44 of the comparator 16 and the high and low reference potential voltage dividers 22 and 24, respectively. Each of the FETs 18 and 20 are provided with biasing resistors 46 and 48 between their gate and drain electrodes, while diodes 50 and 52 are connected between the output terminal 38 of the comparator circuit 16 and the gate electrodes of the FETs 18 and 20, respectively. The cathode of the diode 50 is connected to the gate electrode of the FET 18, while the anode of the diode 52 is connected to the gate electrode of the FET 20.

The voltage dividers 22 and 24 are supplied a regulated, fixed voltage means of a zener diode 54 coupled between ground potential and a positive supply source 56 by means of a current-limiting resistor 58.

When the output of the comparator circuit 16 is high (v+ volts), the diode 55 is biased to its conducting condition and renders FET 18 conductive. Thus, the high reference potential of +5.0 volts is applied to the inverting input terminal 44 of the comparator circuit 16. At the same time, the high output of the comparator circuit back biases the diode 52 so that the FET switch 20 is open and the low reference potential of +0.555 volts is not applied to input terminal 44. However, when the comparator circuit 16 is triggered such that its output switches to its low (V−(16) volts) value, then the diodes 50 and 52 reverse their conductive states, such that FET switch 18 is closed and fet switch 20 is opened. This circuit condition applied the low reference potential of +0.555 volts to the inverting input terminal 44 of the comparator circuit 16.

In summary, it should be apparent that the present invention provides a variable duty cycle signal generator which provides an accurate output signal corresponding to a particular D.C. input signal level, notwithstanding changes in the rate or slope of the integrator circuit used to establish the time-base reference for the signal generator.

Typical devices, components, and values therefor which may be employed in the variable duty cycle signal generator 10 of the present invention are listed below:

| | |
|---|---|
| Integrator 14 | OP.AMP.MC1473P MOTOROLA CO. |
| Comparators 12, 16 | OP.AMP. LM301 NATIONAL SEMIDUCTOR |
| FET 18 | 2N5115 |
| FET 20 | VC 714 |
| Resistors 46,48 | 100 ohms |
| Zener diode 54 | 1N 821 |
| Diodes 50, 52 | IN 914 |

For purposes of clarifying the present invention and simplifying the illustrations, well-known biasing and frequency compensating circuits and techniques normally associated with the use of operational amplifiers such as those used for the integrator and comparator circuits have not been shown or described.

Obviously, many modifications and variations are possible in view of the above teachings. Therefore, it is to be understood that the invention may be practiced otherwise than as specifically described.

I claim:
1. A variable duty cycle signal generator, comprising
   first and second comparator circuits, each having output terminals and first and second input terminals, said first input terminal of said first comparator circuit being adapted to be connected to a source of a variable D.C. potential, and each comparator circuit providing an output signal which changes from one steady state level to another when its input are substantially equal,
   an integrator circuit having an input coupled to said output terminal of said second comparator circuit for generating positive and negative-going linear ramp signals in response to the state of the output signal of said second comparator circuit, said integrator circuit further having an output terminal coupled to said first input terminal of said first and second comparator means,
   first and second reference potential sources having predetermined D.C. values,
   switching means electrically coupled between said first and second reference potential sources and said second terminal of said second comparator circuit, said switching means further being coupled to said output terminal of said second comparator means and responsive thereto to selectively apply said first and second reference potential sources to said second input terminal of said second comparator circuit,
   whereby said integrator circuit generates a triangular wave-form signal whose peaks are fixed and accurately correspond to the D.C. values of said first and second reference potential sources.

2. The generator as defined in claim 1, wherein said switching means, comprises
   first and second field effect transistors having their source-drain paths coupled between said first and second reference potential sources, respectively, and said second input terminal of said second comparator circuit,
   together with
   first and second diodes connected between said output terminal of said second comparator circuit and the gate electrodes of said first and second field effect transistors, respectively, said first and second diodes being poled in opposite directions, thereby to selectively actuate said first and second field effect transistors in a manner corresponding to the level of the output signal of said second comparator circuit.

3. Circuitry to establish the endpoints of the ramp output of a signal generator, comprising
   an integrator circuit having input and output terminals, said integrator circuit generating positive and negative going linear ramp signals in response to the polarity of a signal applied to its input terminal,
   a comparator circuit having two input terminals and an output terminal, said comparator being adapted to provide an output signal which changes from one steady state level to another when its inputs are substantially equal, said output terminal of said comparator being connected to the input terminal of said integrator circuit and one of said input terminals of said comparator circuit being connected to the output terminal of said integrator circuit,
   first and second reference potential sources having predetermined values, and
   switching means electrically coupled between the other input terminal of said comparator circuit and said first and second reference potential sources, said switching means further being coupled to said output terof said comparator circuit and responsive thereto to selectively apply said first and second reference potential sources to said other terminal of said comparator circuit,
   whereby said integrator circuit generates a triangular waveform signal whose endpoints are established by and accurately correspond to the D.C. values of said first and second reference potential sources.

4. The circuitry defined in claim 3, wherein said switching means, comprises
   first and second field effect transistors having their source-drain paths coupled between said first and second reference potential sources, respectively, and said other input terminal of said comparator circuit, together with first and second diodes connected between said output terminal of said comparator circuit and the gate electrodes of said first and second field effect transistors, said first and second diodes being poled in opposite directions, thereby to selectively switch said field effect transistors between their on and off states corresponding to the output signal level of said comparator circuit.

* * * * *